Figure 1:
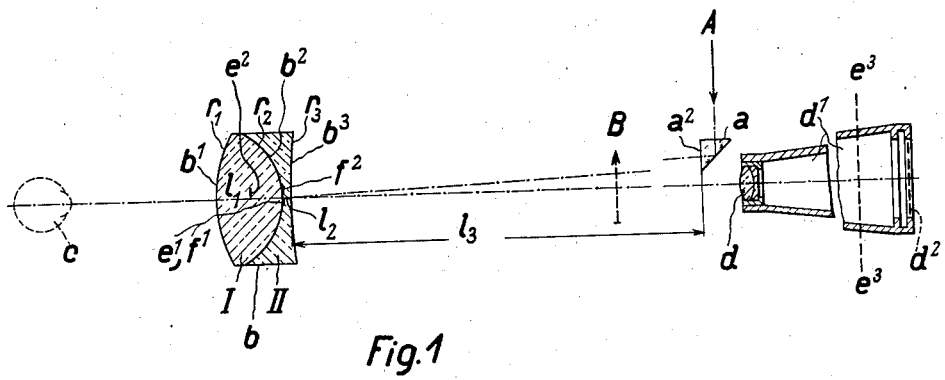

Inventor:
Hans Hartinger

Patented June 17, 1930

1,764,870

UNITED STATES PATENT OFFICE

HANS HARTINGER, OF JENA, GERMANY, ASSIGNOR TO THE FIRM CARL ZEISS, OF JENA, GERMANY

APPLIANCE FOR EXAMINATION OF THE EYES

Application filed February 28, 1929, Serial No. 343,445, and in Germany February 24, 1928.

The invention refers to appliances which are destined for the examination of the eyes (e. g. to ophthalmoscopes, refractometers and retina cameras) and are provided with a lens with which, on one hand, there is obtained an image of the interior of the eye to be photographed or inspected f. i. through a magnifying glass by the examiner, and through which, on the other hand, the rays of light are passing for illuminating the eye to be examined. In appliances for examination of this kind there cannot be avoided that, when the illuminating rays which are coming from that side from where the examination is to take place are striking the said lens, reflexion images of the source of light will be produced by the refracting surfaces of the said lens, which reflexion images, in the case of the appliances known hitherto, could be seen by the examiner or were showing on the photographic plate, so that disturbances were possible in the examination.

According to the invention, such disturbances caused by the reflexion images can be completely eliminated by providing suitable arrangement and curvature of the refracting surfaces of the said lens in such a way that the reflexion images will be small in relation to the diameter of the image-forming pencil of rays, and, moreover, by providing stops covering the reflexion images for the examiner. In the case of real reflexion images these stops are to be provided on the loci of the reflexion images themselves or near the same or, in the case of virtual reflexion images where on the loci of the images stops would be of no effect, on the producing surface. However, in the case of an optical system, with the source of light outside the axis of this system where, by the said lens, there is obtained a reflexion image lying outside the optical axis in a greater distance from the lens, according to the invention, a corresponding flexure of the lens surface causing this reflexion image will prevent the pencil of rays producing the reflexion image from striking the examination system, for which reason the provision of a stop will not be necessary for this image.

When real reflexion images are produced within the lens itself, it is advisable to choose for the refracting surfaces such a distance from each other that the said reflexion images will be on one of the refracting surfaces next to the surface producing them, so that the stops for these reflexion images can be provided on the refracting surfaces of the lens. In such a way an eventual cutting through of the lens, necessary for providing the diaphragms on the locus of the image, is avoided.

The bounding surface of the lens, facing the source of light, is suitably curved in such a manner that its concave side faces the source of light. Then, provided that the source of light is on the axis of the image-forming system, and when making the radius of curvature of the said bounding surface equal to the distance of the source of light from the lens, it can be attained that the reflexion image produced by this bounding surface is falling into the source of light itself. In this case, the stopping down of the reflexion image is effected by the stop which already is stopping down the source of light against the examination system. When the source of light is outside the axis of the image-forming system, in which case generally it is provided next to the examination system, it would seem natural to make the radius of curvature of the bounding surface of the lens, facing the source of light, equal also to the distance of this surface from the source of light. Then, the reflexion image produced by the surface in general would also be next to the examination system and a stopping down would not be necessary any longer. When the source of light is outside the optical axis of the image-forming system, without the necessity of providing a stop for the corresponding reflexion image, however, it is possible also to make to a certain extent the radius of curvature of the bounding surface lying next to the source of light larger or smaller than the distance between the source of light and the said bounding surface. It has proved to be appropriate to fully make use of the possibility of deflection, i. e. to regulate the path of the rays in such a manner that the cone of rays producing the reflexion image of the lens surface next to the source of light will narrowly pass the examination system. Then, the lens surface next to the source of light can be made use of for the production of images, whereas, when its radius of curvature is chosen to be equal to its distance from the source of light, the lens will not contribute to the production of images.

Figure 2:
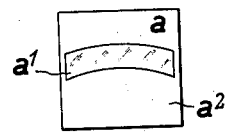

In the drawing a constructional example is given of the optical system of an appliance corresponding to the invention. Fig. 1 is a section through the system, Fig. 2 the view of a single part in a larger scale, and Fig. 3 a cutting from a single part in a strongly enlarged scale.

Figure 3:
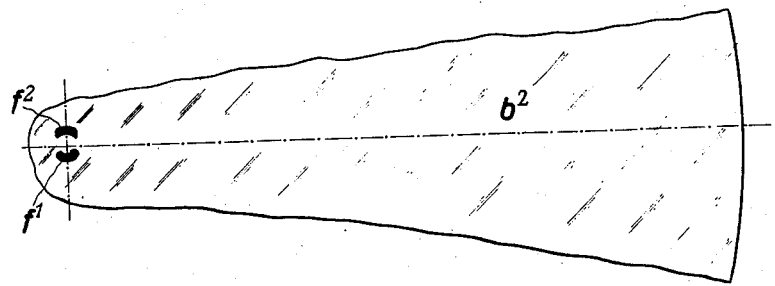

As source of light there serves a diaphragm formed by a slit $a^1$ which is rubbed out from the blackened surface $a^2$ of a prism $a$, on which light is striking in the direction of the arrow A. From slit $a^1$ the light is falling on a lens $b$ which directs it to the eye to be examined indicated at $c$. The lens $b$ together with the eye to be examined produce at B an image of the retina of this eye, which image, by means of an objective $d$ of a camera $d^1$, will show on a plate sensible to light $d^2$ and, consequently, can be examined. The lens $b$ has three refracting surfaces $b^1$, $b^2$ and $b^3$ which cause the formation of reflexions. They are chosen in such a way that from the surface $b^1$ there is projected a real reflexion image $e^1$ of the source of light $a^1$ on the surface $b^2$, of the surface $b^2$ a virtual reflection image $e^2$ and of the surface $b^3$ a real reflexion image immediately below the camera $d^1$ in the plane $e^3$—$e^3$. The reflexion image $e^1$ is rendered harmless by the stop $f^1$ provided on the surface $b^2$, which diaphragm coincides with the image $e^1$ and the image $e^2$ by the diaphragm $f^2$ also provided on the surface $b^2$. The image of the surface $b^3$ is outside the field of view of the camera $d^1$ and also the cone of rays producing this image will not strike the objective $d$ of the camera $d^1$, for which reason no stop will be necessary for this reflexion surface. In Fig. 3 the stops $f^1$ and $f^2$, in a strongly enlarged scale, approximately are in right proportion to the diameter of the lens $b$. As will be seen from the drawing, the said diaphragms are very small.

On the table below the constructional data of the lens $b$ are given; the corresponding figures representing millimeters.

| Radii | Thicknesses and distances |
|---|---|
| $r_1 = +54.746$ | $l_1 = 27.3$ |
| $r_2 = -30.026$ | $l_2 = 3.0$ |
| $r_3 = +300.179$ | $l_3 = 271.5$ |

Kinds of glass

| Lens I | Lens II |
|---|---|
| $n_d = 1.6477$ | 1.4783 |
| $v_d = 33.9$ | 65.9 |

In order to bring about a spherical correction of the lens and to come up to the sinus condition, the surface $b^1$ is deformed. The above mentioned radius $r_1$ of the surface is the radius in the vertex of same. The distances of the reflexion images from the appertaining lens surface, given in millimeters, are for the surfaces $b^1 + 27.136$
$b^2 - 13.923$
$b^3 + 335.631$

I claim:

In an appliance for examination of the eyes an examination device, an apertured diaphragm, a lens adapted to conduct to the eye to be examined rays of light coming from the aperture in the diaphragm and to the examination device rays coming back from the interior of the eye to be examined, the said lens being composed of a biconcave lens and a biconvex lens, which two lenses are cemented together and of which the biconcave one is facing the diaphragm, the exterior surface of the biconvex lens projecting of the diaphragm a real reflexion image on the cemented surfaces of the joint lenses, and the interior surface of the bi-convex lens projecting of the diaphragm a virtual reflexion image on the interior of the biconvex lens, and two stops provided between the cemented surfaces, of which stops one is on the locus of the said real reflexion image and the other covers the said virtual reflexion image for the examination device.

HANS HARTINGER.